United States Patent [19]

Pickles

[11] 4,178,037
[45] Dec. 11, 1979

[54] SEAT RECLINER ASSEMBLY

[75] Inventor: Joseph Pickles, Birmingham, Mich.

[73] Assignee: Ferro Manufacturing Corporation, Detroit, Mich.

[21] Appl. No.: 910,296

[22] Filed: May 30, 1978

Related U.S. Application Data

[63] Continuation-in-part of Ser. No. 730,228, Oct. 6, 1976, abandoned, Ser. No. 651,716, Jan. 23, 1976, abandoned, and Ser. No. 552,974, Feb. 26, 1975, Pat. No. 3,973,288.

[51] Int. Cl.² .................. A47C 1/00; A47C 1/026
[52] U.S. Cl. .................................. 297/326; 297/365; 297/379
[58] Field of Search ............... 297/354, 355, 378, 379, 297/325–328, 331, 334–336, 344, 366–368, 365

[56] References Cited

U.S. PATENT DOCUMENTS

| 484,058 | 10/1892 | Sinsabaugh | 297/336 |
| 1,957,004 | 5/1934 | Smith | 297/325 |
| 2,286,784 | 6/1942 | Benzick et al. | 297/368 |
| 2,324,902 | 7/1943 | Benzick et al. | 297/325 X |
| 3,449,012 | 6/1969 | Caron | 297/378 X |
| 3,926,474 | 12/1975 | Johndrow et al. | 297/378 X |

FOREIGN PATENT DOCUMENTS

| 2022193 | 12/1971 | Fed. Rep. of Germany | 297/379 |
| 2404216 | 8/1975 | Fed. Rep. of Germany | 297/379 |
| 621844 | 5/1927 | France | 297/326 |
| 1457661 | 11/1966 | France | 297/354 |
| 1481567 | 4/1967 | France | 297/378 |

Primary Examiner—Roy D. Frazier
Assistant Examiner—William E. Lyddane
Attorney, Agent, or Firm—Whittemore, Hulbert & Belknap

[57] ABSTRACT

A recliner assembly for a vehicle seat back in which a pivoted seat back support member is pivoted to a normally stationary seat support member, and the seat back support member is provided with an arcuate series of locking teeth concentric with its pivot axis. A pawl is slidably mounted between a raised trackway on the seat support member and a cover plate is provided having portions engaging the sides of the raised trackway. A locking cam moves a pawl into engagement with the toothed arcuate portion of the seat back support member and locks it against displacement in adjusted position. The support members are pivotal as a unit from upright to forward inclined position, and the seat support members at opposite sides of the assembly are connected by a rigid torque-transmitting bar.

3 Claims, 5 Drawing Figures

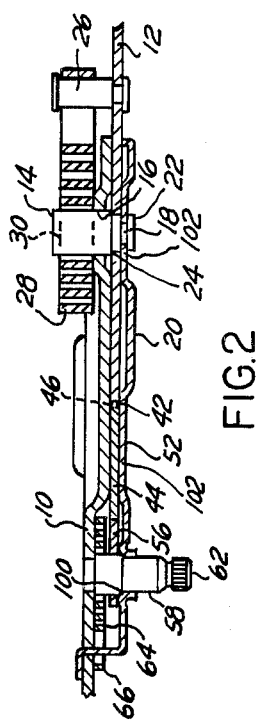
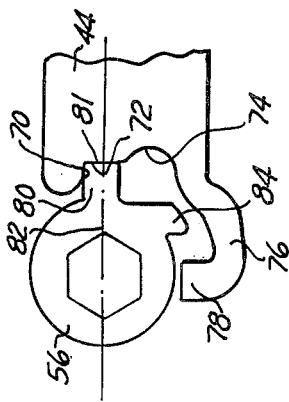
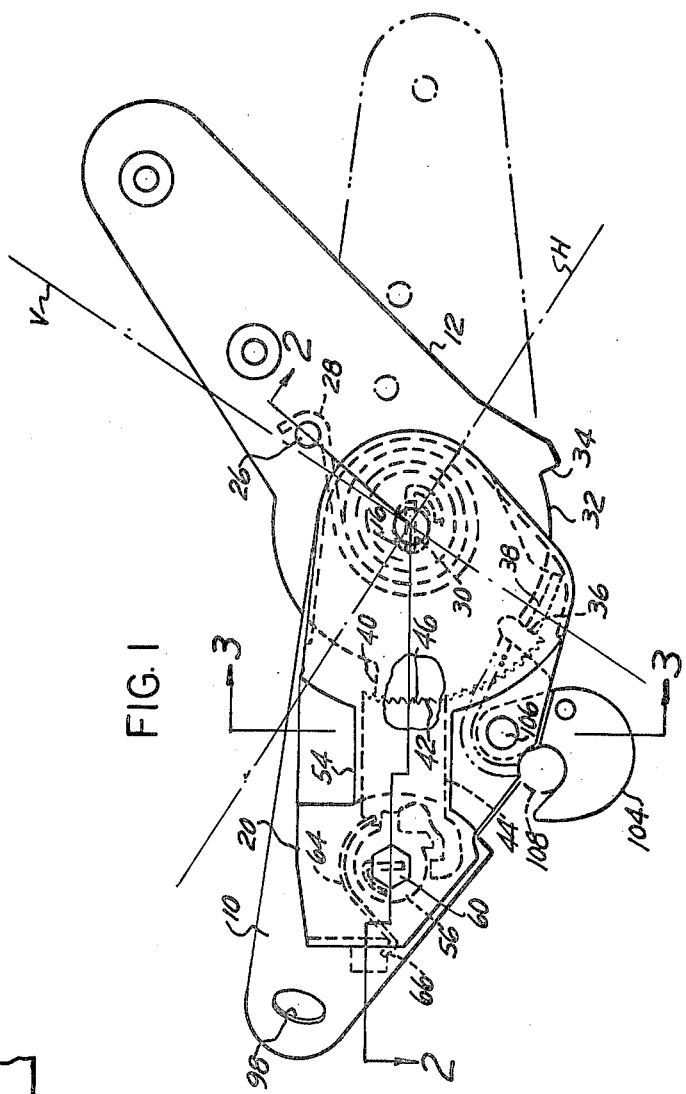
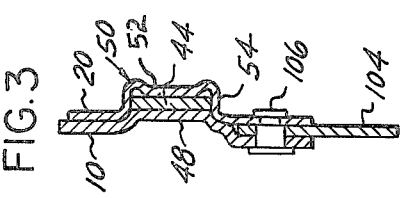
FIG. 1
FIG. 2
FIG. 3
FIG. 4

SEAT RECLINER ASSEMBLY

CROSS REFERENCE TO RELATED APPLICATIONS

The present invention is a continuation-in-part of my co-pending applications Ser. No. 730,228, filed Oct. 6, 1976, now abandoned; Ser. No. 651,716, filed Jan. 23, 1976, now abandoned; and Ser. No. 552,974, filed Feb. 26, 1975, now U.S. Pat. No. 3,973,288 dated Aug. 10, 1976.

BRIEF DESCRIPTION OF THE INVENTION

A seat recliner assembly comprises essentially a pair of seat support members or mounting brackets (only one being shown in FIG. 1) which normally occupy a fixed position in the vehicle but which are rockable to a forward inclined position affording extra room for a passenger's movement into the rear seat of the vehicle. A pair of seat back support members or brackets are pivoted to the seat mounting brackets for rocking movement and in general the amount of movement is limited between an upright position in which it is inclined slightly rearwardly from the vertical and a rear reclining position which may be as nearly horizontal as desired.

It is to be noted that each seat support bracket is formed of essentially flat stock and the seat support brackets are interconnected solely by a single torque-transmitting bar.

One of the seat back brackets is provided with a relatively strong bias spring which is capable of returning the seat back bracket and the seat back connected thereto from any rearwardly displaced position to a limiting upright position. The other seat back bracket may omit all ancillary structure, as will be seen in FIG. 5.

The seat back bracket, as seen in FIGS. 1-4, may be positively locked in any intermediate position by means of toothed interengaging means comprising an arcuate sector on the seat back bracket provided with latching teeth and a slidable movable pawl having matching latching teeth engageable with the teeth on the seat back bracket sector. The pawl is mounted for sliding movement toward and away from the toothed sector by means of a raised trackway provided on the seat mounting bracket and retained in such position by a cover plate overlying the pawl and having portions bent downwardly to engage opposite sides of the raised trackway.

The pawl is actuated by a rotatable cam having a finger engageable with a camming surface on the pawl and movable into engagement with a surface substantially perpendicular to the direction of movement of the pawl to constitute an abutment preventing return or release movement of the pawl by forces applied through the vehicle seat back to the seat back bracket.

In addition, the cam and pawl include engaging portions movable after movement of the finger out of blocking engagement with the pawl to provide positive actuation of the pawl by the cam member in a direction away from the toothed sector of the seat back mount.

BRIEF DESCRIPTION OF THE DRAWING

FIG. 1 is a side elevation of the seat recliner assembly.

FIG. 2 is a sectional view on the line 2—2, FIG. 1.

FIG. 3 is a section on the line 3—3, FIG. 1.

FIG. 4 is an enlargement of the pawl and cam structure seen in FIG. 1.

DETAILED DESCRIPTION

Figure 5:
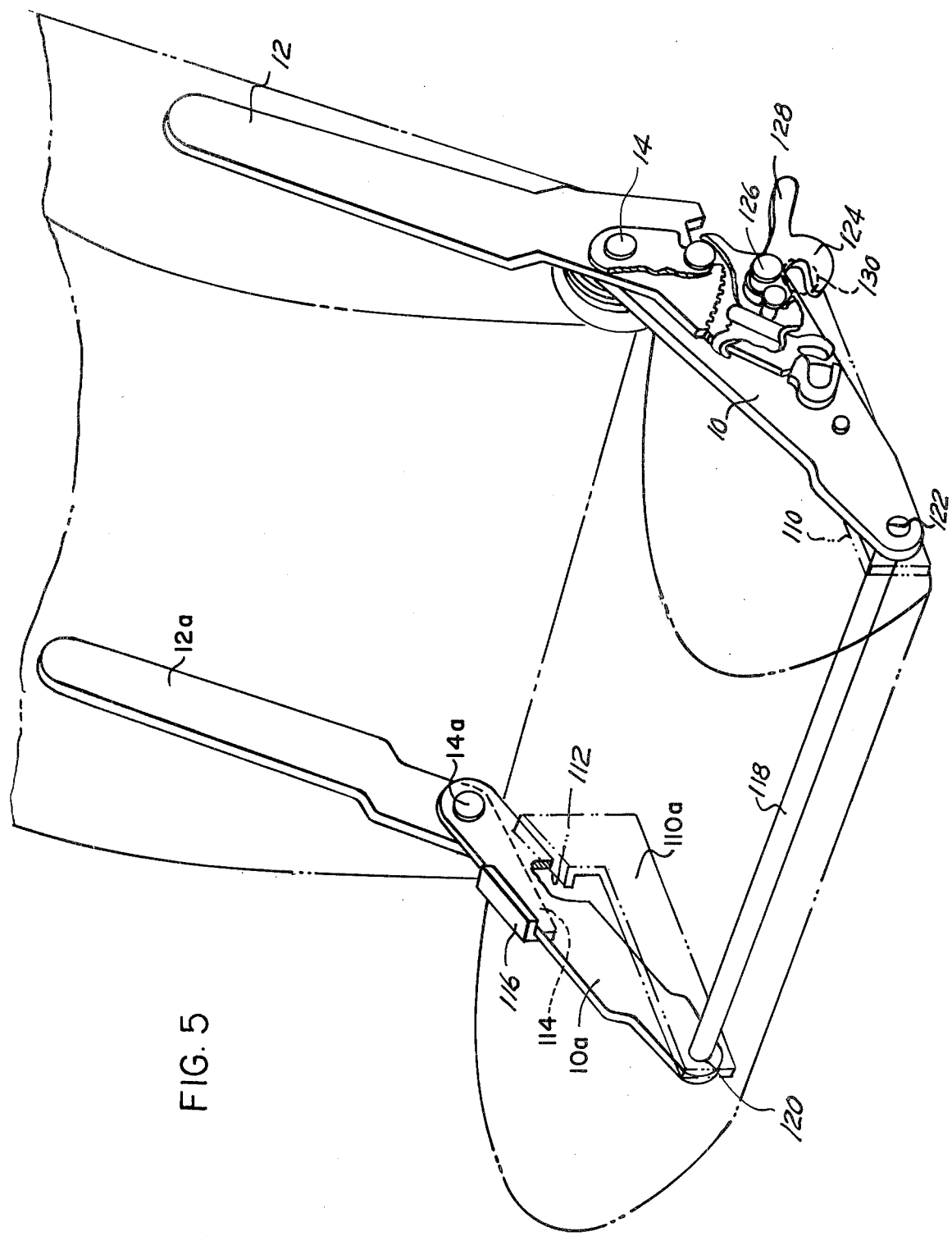
FIG. 5 is a perspective, showing both brackets and the torsion bar.

Referring now to FIGS. 1-4, the seat recliner assembly comprises a pair of seat back support members or brackets one of which is illustrated in FIG. 1 in full lines in a position in which the seat back support is inclined rearwardly from the vertical at a relatively small angle here illustrated as about 23°. In the drawing, the dot and dash line V is a vertical line and the dot and dash line H is a horizontal line.

The assembly comprises a seat mounting bracket 10 which is formed of relatively stiff metal plate of uniform thickness bent and embossed as will be subsequently described. This bracket will be associated with a similar bracket at the opposite side of the seat and if desired, seat latching constructions may be provided at both ends of the seat. However, it is usually sufficient to provide the latching structure illustrated herein at one side and to simply pivot the seat back construction at the opposite end of the seat, as seen in FIG. 5.

Pivoted to the seat mounting bracket is a seat back support member or bracket 12, the pivot mounting comprising a pivot stud 14 extending through aligned openings 16 and 18 in the seat mounting bracket 10 and the seat back bracket 12, respectively. Associated with the brackets 10 and 12 is a sheet metal cover plate 20 formed from flat stock as shown in the drawings and the stud 14 extends through the cover plate 20 which is riveted as indicated at 22. The stud includes a shoulder 24 engaging with the side of the bracket 12 opposite to the riveted portion thereof and this rigidly affixes the stud to the assembly. The opening 16 in the seat mounting bracket is of non-circular configuration as best seen in FIG. 1, so that the stud is retained against rotation therein.

The seat back bracket is provided with a spring supporting stud 26 engaged by one end of a relatively strong coil spring 28, the other end of which is received in a slot 30 in the stud 14. The spring is pretensioned such that it is capable of returning the seat back to its limiting upright position whenever the latching mechanism is released. It will be understood of course that in order to position the seat back in predetermined position, the occupant of the seat must release the latching mechanism and press rearwardly to move the seat to the desired position.

The seat back bracket 12 is formed from flat stock as shown and is provided with an arcuate recess 32 extending between radially disposed shoulders 34 and 36 which cooperate with a laterally turned finger or abutment 38 provided on the seat support bracket 10. In the position shown in full lines the seat back bracket 12 is in its upright position with the shoulder or abutment surface 36 engaging one end of the abutment finger 38. From this position the bracket 12 mount is rotatable clockwise until the abutment surface 34 engages the opposite side of the finger 38.

The seat back bracket includes an arcuate sector portion 40 provided with locking teeth 42 as seen through an opening provided in the cover plate 20 in FIG. 1.

Associated with the arcuate toothed portion 40 of the seat back bracket is a generally rectangular pawl 44 having teeth 46 matching the teeth 42 and disposed in the same arcuate configuration so that in all positions of the seat back bracket a full complement of latching or locking teeth on the seat back bracket and the pawl are in engagement.

The pawl 44 is formed of flat stock and is mounted for rectilinear sliding movement in a direction toward and away from the toothed sector 40 of the seat back bracket 12 on a raised trackway 48 provided on the bracket 10, as best illustrated in FIG. 3. The pawl 44 is retained in position by a suitably embossed portion 50 of the cover plate 20, the embossment thereof engaging opposite sides of the raised trackway 48. In order to provide for free sliding movement of the pawl, the embossment 50 of the cover plate includes an indented central portion 52 which insures that the side walls 54 of the embossment are flat and engageable with the sides of the pawl 44 to avoid binding thereof.

Associated with the pawl 44 is a rotatable cam 56 fixed to a rotatable cam shaft 58 by means of matching hexagonal configurations illustrated at 60. The cam shaft 58 is provided with a knurled end portion 62 for the reception of a handle and is biased in a direction to bring about latching or locking of the seat back by a coil spring 64, one end 66 of which extends through an opening in the cover plate 20.

As best seen in FIG. 4, the end of the pawl 44 adjacent the cam 50 is provided with a shoulder 70 having an abutment surface limiting counterclockwise rotation of the cam 56.

The end of the pawl 44 has a recess including a locking surface 72 which extends perpendicular to the direction of movement of the pawl 44. In addition, at the side of the recess providing the surface 72, the pawl is further recessed as indicated at 74 to provide a camming surface and space which permits movement of the pawl to the left as seen in FIG. 4, under conditions to be described. Also, the pawl 44 includes an end extension or retractor finger 76 terminating in an abutment 78 whose purpose will be described.

The rotatable cam 56 includes a camming and locking finger 80 including a camming portion and a surface portion 81 which extends perpendicular to a line 82 parallel to the direction of movement of the pawl 44 and engageable with the surface 72 so as to prevent movement of the pawl 44 in a releasing direction, or to the left as seen in FIG. 4. This is because the surfaces 72 and 81, being perpendicular to the direction of movement of the pawl 44, do not transmit torque to the cam as a result of forces applied to the pawl resulting from torque applied to the seat back mount. The cam further has a retracting finger 84 engageable with the abutment on retractor finger 76 to effect positive unlocking of the seat back.

The bias spring 64 tends to rotate the cam 56 counterclockwise as seen in FIG. 4 so as to retain it in blocking position in which the surfaces 72 and 81, being perpendicular to the line 82 prevent forces applied to the pawl 44 through the seat back bracket 12 from applying a torque to the cam. Thus, the seat back is positively locked in adjusted position under all conditions even including those productive of relatively great forces such as might be encountered in collision.

The cam 56 includes a second finger 84 which is engageable with the abutment 78, but only after the camming finger 80 has moved out of blocking engagement with the surface 72 of the pawl 44. This will result in positive movement of the pawl 44 to a releasing position and will permit the seat back to be moved rearwardly by the occupant or forwardly by the spring 28.

It will be observed that the cover plate 20 is shaped to have an annular portion 100 of limited radial extent engaging the cam 56 around the cam shaft 58. In addition, the cover plate has the previously described embossed portion 50 with the indentation 52, which extends longitudinally of the pawl to overlie the toothed portion at the end of the pawl 44. Also, the cover plate 20 includes an embossed area 102 of limited radial extent engageable with the side of the seat back bracket 12 and retained against the side of the seat back bracket by the rivet formation 22 previously described. The remainder of the cover plate 20 is spaced laterally from the adjacent sides of the cam 56, the pawl 44, and the seat back bracket 12 to minimize frictional resistance to movement thereof.

The seat mounting brackets 10 are pivoted to the floor of the vehicle by suitable means located in an opening 98 therein and can be retained in fixed position by means of a hook shaped latch 104 pivoted to the bracket 10 as indicated at 106, and engageable with a fixed locating element 108.

Referring now to FIG. 5, the seat mounting structure providing for forward tilting of the entire seat construction to facilitate entrance of a passenger to the rear seat is illustrated in perspective. In this Figure, corresponding parts are given the reference characters applied in FIGS. 1-4, with the addition of reference letter a, as required to distinguish the right hand structure as will be apparent.

As clearly seen in FIG. 5 the assemblies at opposite sides of the seat each comprises essentially three elements formed from flat plate stock exhibiting great strength in the directions in which stress is applied, while being economical in that the elements may be stamped and bent into final shape from relatively inexpensive flat stock of uniform thickness. In order to coordinate movement of the two widely separated assemblies, a substantially rigid torque transmitting bar is fixedly secured at its ends to the tilting seat brackets, and in addition the bar forms the pivot connection between stationary mounting brackets and tilting seat brackets, to insure unitary tilting of the entire seat structure forwardly to provide access to the rear seat of a vehicle.

The stationary structure on which the entire seat structure is carried includes normally stationary base support members or brackets 110 and 110a, member 110a having an angularly bent support shoulder 112 on which seat support member or bracket 10a rests in the normal position. Seat support members or brackets 10 and 10a are separate, independent, and spaced apart. Member 10a is symmetrical with member 10 as to pivot points, but omits the latching mechanism previously described.

Separate, independent, spaced seat back support members or brackets 12 and 12a are pivoted to members or brackets 10 and 10a by pivot studs 14 and 14a, stud 14a is this instance being a simple pivot connection. Seat back support member 12a has a forwardly extending arm 114 having a laterally extending stop abutment 116 overlying the top edge of member 10a, and will thus limit forward swinging of seat back support member 12a to the illustrated position, which of course is the upright position of the seat back. Similar structure may be provided between members 10 and 12, but is not required, the seat back serving as a rigid connection between members 12 and 12a.

While abutment 116 prevents forward swinging of the seat back relative to members 10, 10a beyond a limiting upright position, the entire seat construction including members 10 and 10a may be swung forwardly to afford access to the rear seat. For this purpose, a rigid torque-transmitting bar 118 is pivoted adjacent its ends in openings 120 provided at the forward ends of stationary brackets 110, 110a. The ends of bar 118 are fixedly received in openings 122 at the forward ends of the seat support members 10 and 10a.

In order to control tilting of seat support members from their normal position to the forward clearance position, one of them (here illustrated as member 10) is provided with a manually operable hook 124 pivoted as indicated at 126 to the seat support member 10 and provided with an actuating finger 128. The adjacent base support member 110 has a laterally projecting pin 130 which is engageable by hook 124 to prevent tilting of members 10 and 10a about the axis of torque transmitting bar 118.

When hook 124 is disengaged from pin 130, the seat support members 10 and 10a and the seat back support members 12 and 12a all pivot as a unit together with torque-transmitting bar 118. This tilting may be accomplished by pushing the seat back forwardly, and the forward lifting torque is transmitted to the brackets 10, 10a through the stop abutment 116 and the fixed connection between bar 118 and the brackets 10, 10a.

The formation of the stationary supports and support brackets from flat stock, and the pivots established by arranging the flat sides of these members in side-by-side relation, with the width dimension of the members vertical provides a very rugged construction in which full advantage is taken of the strength and rigidity of essentially flat elongated members, and at the same time providing for extremely economical production.

Briefly reviewed in general terms, the present invention comprises a reclining vehicle seat construction for supporting a seat back for pivotal movement relative to a vehicle seat and for supporting the seat and seat back for simultaneous forwardly and upwardly pivotal movement to provide access to a space in the rear of the vehicle. The construction comprises a pair of generally similar assemblies spaced apart laterally of the vehicle. Each assembly consists essentially of three members formed from flat stock of uniform thickness, thus permitting the members to be economically manufactured by simple stamping operations. The three members for each assembly comprises an elongated base support, which may be fixed in the vehicle or which may be mounted on a track for longitudinally sliding movement. An elongated seat support member is pivoted at its forward end to the forward end of the base support, and an elongated seat back member is pivoted at one end to the rear end of the seat support member and is movable relative thereto between a generally upright position and a rearwardly inclined reclining position. In order to ensure equal pivotal movement of the seat and seat back support members, a substantially rigid torque-transmitting member is provided which extends between the seat and back supporting assemblies and constitutes the only connection therebetween, except of course for the seat and seat back when applied to the seat support construction. The torque-transmitting member is rigidly connected at its ends to the forward ends of the seat support members and is pivotally connected adjacent its ends to both of said base support members. The torque-transmitting member thus ensures simultaneous equal tilting of both seat support members as the entire seat construction is tilted forwardly and upwardly to provide access in the space to the rear of the seat construction.

Rigid abutment means are provided between one of the seat support members and the seat back support member pivoted thereto operable when the seat back support member is in an upright position. As a result force applied in a forward direction to the top of a seat back mounted on the seat back support members causes unitary forward and upward tilting of the entire seat construction about the pivot construction at the forward end of the base support members. The support members, each of which is generally in the form of an elongated flat member, and their width dimensions in vertical planes and their length dimensions extending longitudinally in the case of the base support member and seat support member, and generally upright in the case of the seat back support member.

The use of elongated members formed from flat stock provides very great strength in the direction in which forces are applied although resistance to transverse forces is relatively less. However, the members are in side-by-side sliding abutment at their pivot connections so that they mutually reinforce each other against transverse stresses.

What I claim as my invention is:

1. A reclining vehicle seat and seat back supporting construction for supporting a seat back for pivotal movement relative to a vehicle seat, and for supporting the seat and seat back for simultaneous forwardly and upwardly pivotal movement to provide access to a space in rear of the seat, said construction comprising a pair of generally similar assemblies spaced apart laterally of the vehicle, each assembly consisting essentially of three flat elongated members shaped to provide for fabrication from flat stock by cutting and bending, said members for each assembly comprising an elongated flat base support member extending longitudinally of the vehicle and having its width dimension occupying a vertical plane, an elongated flat seat support member pivoted at its forward end to the forward end of said base support member, said seat support member having its width dimension occupying a vertical plane and having a flat side of its forward end in mutually supporting side-by-side sliding contact with a flat side of the forward end of said base support member, and an elongated flat seat back support member pivoted at one end to the rear end of said seat support member and movable relative thereto between a generally upright position and a rearwardly inclined reclining position, said seat back support member having its width dimension occupying a vertical plane and having a flat side of its said one end in mutually supporting side-by-side sliding contact with a flat side of the rear end of said seat support member, latch means for latching said seat back support member to said seat support member in a selectd one of a plurality of positions between upright and reclining position, said seat support members being separate, independent, and spaced apart, a torque-transmitting member extending transversely between said assemblies and rigidly connected at its ends to the forward ends of said seat support members, said torque-transmitting member being pivotally connected adjacent its ends to both of said base support members and constituting the sole connection between said assemblies to ensure simultaneous equal tilting of both of said seat support members as the entire seat construction is tilted forwardly and upwardly to provide access to the space in rear of the seat construction, and rigid abutment means acting between one of said seat support members and the seat back support member pivoted thereto and engageable when said seat back support member is in upright position whereby force applied in a forward direction to the top of the seat back mounted on said seat back support member causes unitary forward and upward tilting of the entire seat construction about the pivot connections at the forward ends of said base support members.

2. A construction as defined in claim 1, in which one of said seat back support members comprises a short arm extending forwardly from the pivot connection between said one seat back support member and the seat support member which it is pivoted, said abutment means comprising an abutment carried by said arm and engageable with the upper edge of the associated seat support member.

3. A construction as defined in claim 2 in which said short arm extends forwardly in co-planar relation from the lower end of said one seat back support member in sliding contact with the side of the associated seat support member, said abutment being a lug bent laterally from the upper edge of said short arm and overlying an edge of the adjacent seat member.

* * * * *